(12) United States Patent
Terashima et al.

(10) Patent No.: US 8,174,440 B2
(45) Date of Patent: May 8, 2012

(54) POSITIONING METHOD, PROGRAM THEREOF, AND POSITIONING DEVICE

(75) Inventors: Maho Terashima, Nagano (JP); Akira Kimura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 575 days.

(21) Appl. No.: 12/352,127

(22) Filed: Jan. 12, 2009

(65) Prior Publication Data

US 2009/0185604 A1 Jul. 23, 2009

(30) Foreign Application Priority Data

Jan. 18, 2008 (JP) ................................. 2008-008724

(51) Int. Cl.
*G01S 19/24* (2010.01)
*G01S 19/25* (2010.01)
(52) U.S. Cl. ............................... 342/357.63; 342/357.64
(58) Field of Classification Search ............. 342/357.64, 342/357.63, 357.42
See application file for complete search history.

(56) References Cited

U.S. PATENT DOCUMENTS

| | | | | |
|---|---|---|---|---|
| 6,078,290 A * | 6/2000 | McBurney et al. | ...... | 342/357.31 |
| 6,329,946 B1 * | 12/2001 | Hirata et al. | ............ | 342/357.62 |
| 2007/0046536 A1 * | 3/2007 | Jia et al. | ................. | 342/357.12 |
| 2007/0160117 A1 * | 7/2007 | Nitta et al. | ................. | 375/145 |

FOREIGN PATENT DOCUMENTS

| | | |
|---|---|---|
| JP | H06-088865 A | 3/1994 |
| JP | H11-002674 A | 1/1999 |
| JP | H11-258326 A | 9/1999 |
| JP | 2003-037526 A | 2/2003 |
| JP | 2005-064983 A | 3/2005 |
| JP | 2006-254500 A | 9/2006 |
| JP | 2006-345128 A | 12/2006 |

OTHER PUBLICATIONS

S. Soliman et al., GPS receiver sensitivity enhancement in wireless applications, IEEE MTT-S Symposium on Technologies for Wireless Applications, p. 181-186, Feb. 1999.*

* cited by examiner

*Primary Examiner* — Thomas Tarcza
*Assistant Examiner* — Fred H Mull
(74) *Attorney, Agent, or Firm* — Global IP Counselors, LLP

(57) ABSTRACT

A positioning method includes (a) executing a cumulative addition for either one of the polarities on each of an I Q components of0 a received positioning signal, which is spread-modulated with a spread code reversed in polarity by navigation data, (b) calculating sum of squares of the result of the cumulative addition, (c) calculating correlation between the sum of squares and a replica code of the spread code, and (d) executing a positioning calculation of the present location based on the result of the correlation calculation.

7 Claims, 6 Drawing Sheets

POSITIONING METHOD, PROGRAM THEREOF, AND POSITIONING DEVICE

Japanese Patent Application No. 2008-008724 filed on Jan. 18, 2008, is hereby incorporated by reference in its entirety.

BACKGROUND

1. Technical Field

The present invention relates to a positioning method, a program of the positioning method, and a positioning device.

2. Related Art

As a positioning system using a positioning signal, a global positioning system (GPS) is widely known, and is used as a positioning device incorporated in, for example, a portable phone or a vehicle navigation device. In GPS, the present location of the positioning device is calculated by obtaining four parameters, namely three-dimensional coordinates representing the location of the device itself and a clock error, based on information such as locations of a plurality of GPS satellites and respective pseudo-ranges between the GPS satellites and the device itself.

A GPS satellite signal transmitted from a GPS satellite is modulated with a spread code called a PRN code unique to each GPS satellite. Further, it is known that the polarity of the PRN code can be reversed at a 20 millisecond interval by a phase modulation with the navigation data (see e.g., JP-A-11-258326).

In a positioning device of the related art, in order to acquire (extract) the GPS satellite signal out of a weak received signal, there is generally used a method of cumulatively adding (accumulating) the received signal for a predetermined cumulative addition period and correlating the signal resulted from the cumulative addition with a replica code of the PRN code.

However, as described above, the timing at which the polarity of the PRN code is reversed (hereinafter referred to as "polarity reversal timing") can occur at a timing of a 20 millisecond interval (hereinafter referred to as "polarity reversible timing"). Therefore, in the case in which the cumulative addition (cumulative calculation) is executed over a polarity reversible timing and the polarity is reversed at the polarity reversible timing, it may well occur that the signal with different polarities is cumulatively added before and after the polarity reversible timing. If a signal with different polarities is cumulatively added, a part or the whole of the received signal is canceled, which causes a problem of degradation in the receiver sensitivity.

SUMMARY

The invention has an advantage of solving the problem described above.

A positioning method according to a first aspect of the invention includes the steps of (a) executing cumulative addition for either one of the polarities on each of an I and Q components of a received positioning signal which is spread-modulated with a spread code reversed in polarity by navigation data, (b) calculating sum of squares of the result of the cumulative addition in step (a), (c) calculating correlation between the sum of squares calculated in step (b) and a replica code of the spread code, and (d) executing a predetermined positioning calculation of the present location based on the result of the correlation calculation in step (c).

Further, a positioning device according to another aspect of the invention includes a cumulative addition section adapted to execute a cumulative addition for either one of the polarities on each of an I and Q components of a received positioning signal which is spread-modulated with a spread code reversed in polarity by navigation data, a calculation section adapted to calculate sum of squares of the result of the cumulative addition by the cumulative addition section, a correlation calculation section adapted to calculate correlation between the sum of squares calculated by the calculation section and a replica code of the spread code, and a positioning section adapted to execute a predetermined positioning calculation based on the result of the correlation calculation by the correlation calculation section to perform positioning of the present location.

According to these aspects of the invention, the cumulative addition is executed for either one of the polarities on each of the I and Q components of the received signal, and the correlation calculation is executed by calculating the sum of squares of the result of the cumulative addition. Therefore, there is no chance of occurring the cancellation of the signals caused by adding the components with the polarities opposite to each other for the respective I and Q components of the received signal, thus the degradation in the receiver sensitivity can effectively be prevented.

Further, as a second aspect of the invention, the positioning method may include, in addition to the first aspect of the invention, the steps of (e) determining a matching part of a polarity reversal timing in the navigation data by comparing time-series data of the received signal with time-series data of the navigation data of the positioning signal, and (f) estimating which polarity thereafter appears more frequently in the received signal based on the result of the determination in step (e), where the cumulative addition is to cumulatively add the signal with the polarity estimated to appear more frequently.

According to the second aspect of the invention, by the so-called a pattern-matching processing between the time-series data of the received signal as object data and the time-series data of the navigation data of the positioning signal used as reference, it becomes possible to easily estimate which polarity thereafter appears more frequently in the received signal. Further, since the cumulative addition for the polarity with a higher likelihood of appearing can be executed, it is possible to realize the efficient cumulative addition of the received signal used for the correlation calculation.

Further, as a third aspect of the invention, the positioning method may include, in addition to the second aspect of the invention, the step of (g) estimating a polarity reversal timing and the polarity of the received signal based on the result of the determination, where executing the cumulative addition is to determine the polarity of each of the I and Q components of the received signal based on the polarity reversal timing and the polarity both estimated in step (g), and to cumulatively add the signal with the polarity estimated to appear more frequently.

According to the third aspect of the invention, it is possible to easily estimate the polarity reversal timing and the polarity of the received signal by the pattern-matching processing substantially the same as that of the second aspect of the invention. Further, by determining the polarity of each of the I and Q components of the received signal based on the estimation result, and executing the cumulative addition on the signal of either positive or negative polarity of a higher likelihood of appearing in accordance with the determination result, it enables to avoid the case in which the signal with different polarity from the targeted polarity is mistakenly added cumulatively, thus to realize the efficient cumulative addition.

Further, as a fourth aspect of the invention, the positioning method may include, in addition to the first aspect of the invention, the steps of (h) selecting a common data part common to navigation data of different positioning signals, (i) determining a matching part in the common data part of a polarity reversal timing by comparing the time-series data of the received signal with the common data part, and (j) estimating which polarity thereafter appears more frequently in the received signal based on the result of the determination in step (i), where executing the cumulative addition is to cumulatively add the received signal with the polarity estimated to appear more frequently.

The navigation data of the GPS satellite signal includes the data such as almanac, ephemeris, an ionospheric correction parameter, or Coordinated Universal Time (UTC) information. Among such data, the almanac, the ionospheric correction parameter, and the UTC information, for example, are the data common to all of the GPS satellite signals. According to the fourth aspect of the invention, it becomes possible to easily estimate which polarity thereafter appears more frequently in the received signal by the pattern-matching processing using the common data part of the navigation data as the reference data. Further, since the cumulative addition can be executed for the polarity with a higher likelihood of appearing, it is possible to realize an efficient cumulative addition of the received signal used for the correlation calculation.

Further, as a fifth aspect of the invention, the positioning method may include, in addition to the fourth aspect of the invention, the step of (g) estimating a polarity reversal timing and the polarity of the received signal based on the result of the determination, where executing the cumulative addition is to determine the polarity of each of the I and Q components of the received signal based on the polarity reversal timing and the polarity estimated in step (g), and to cumulatively add the received signal with the polarity estimated to appear more frequently.

According to the fifth aspect of the invention, it is possible to easily estimate the polarity reversal timing and the polarity of the received signal by the pattern-matching processing substantially the same as that of the fourth aspect of the invention. Further, by determining the polarity of each of the I and Q components of the received signal based on the estimation result, and executing the cumulative addition on the signal of either positive or negative polarity of a higher likelihood of appearing in accordance with the determination result, it enables to avoid the case in which the signal with different polarity from the targeted polarity is mistakenly added cumulatively, thus to realize the efficient cumulative addition.

Further, as a sixth aspect of the invention, the positioning method may include, in addition to the first aspect of the invention, the steps of, (k) making, in the case in which the navigation data corresponding to the positioning signal has been acquired, a first determination of a matching part in the navigation data of a polarity reversal timing by comparing time-series data of the received signal with time-series data of the navigation data of the positioning signal, (l) estimating, in the case in which the navigation data corresponding to the positioning signal has been acquired, which polarity thereafter appears more frequently in the received signal based on the result of the first determination, (h) selecting a common data part common to the navigation data of different positioning signals, (m) making, in the case in which the navigation data corresponding to the positioning signal has not been acquired, a second determination of a matching part in the common data of a polarity reversal timing by comparing the time-series data of the received signal with the common data part, and (n) estimating, in the case in which the navigation data corresponding to the positioning signal has not been acquired, which polarity thereafter appears more frequently in the received signal based on the result of the second determination, where the cumulative addition is to execute for each of the I and Q components of the received signal with the polarity estimated to appear more frequently.

According to the sixth aspect of the invention, in the case in which the navigation data corresponding to the positioning signal has been acquired, the pattern-matching processing is executed using the time-series data of the navigation data of the positioning signal as the reference data, and in the case in which the navigation data corresponding to the positioning signal has not been acquired, the pattern matching processing is executed using the common data part of the navigation data as the reference data. It enables to estimate which polarity thereafter appears more frequently in the received signal regardless of whether or not the navigation data has been acquired. Further, since the cumulative addition for the polarity with higher likelihood of appearing can be executed, it is possible to realize the efficient cumulative addition of the received signal used for the correlation calculation.

Further, as a seventh aspect of the invention, it is also possible to configure a computer-readable medium storing a program that makes a computer incorporated in a positioning device to execute the positioning method of any one of the first through sixth aspect of the invention.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Hereinafter, an example of a preferred embodiment of the invention will be described with reference to the accompanying drawings. It should be noted that although a portable phone will be exemplified as an electronic apparatus equipped with a positioning device, and the case in which the GPS is used as the positioning system will be explained, the embodiment to which the invention can be applied is not limited thereto.

1. Functional Configuration

Figure 1:
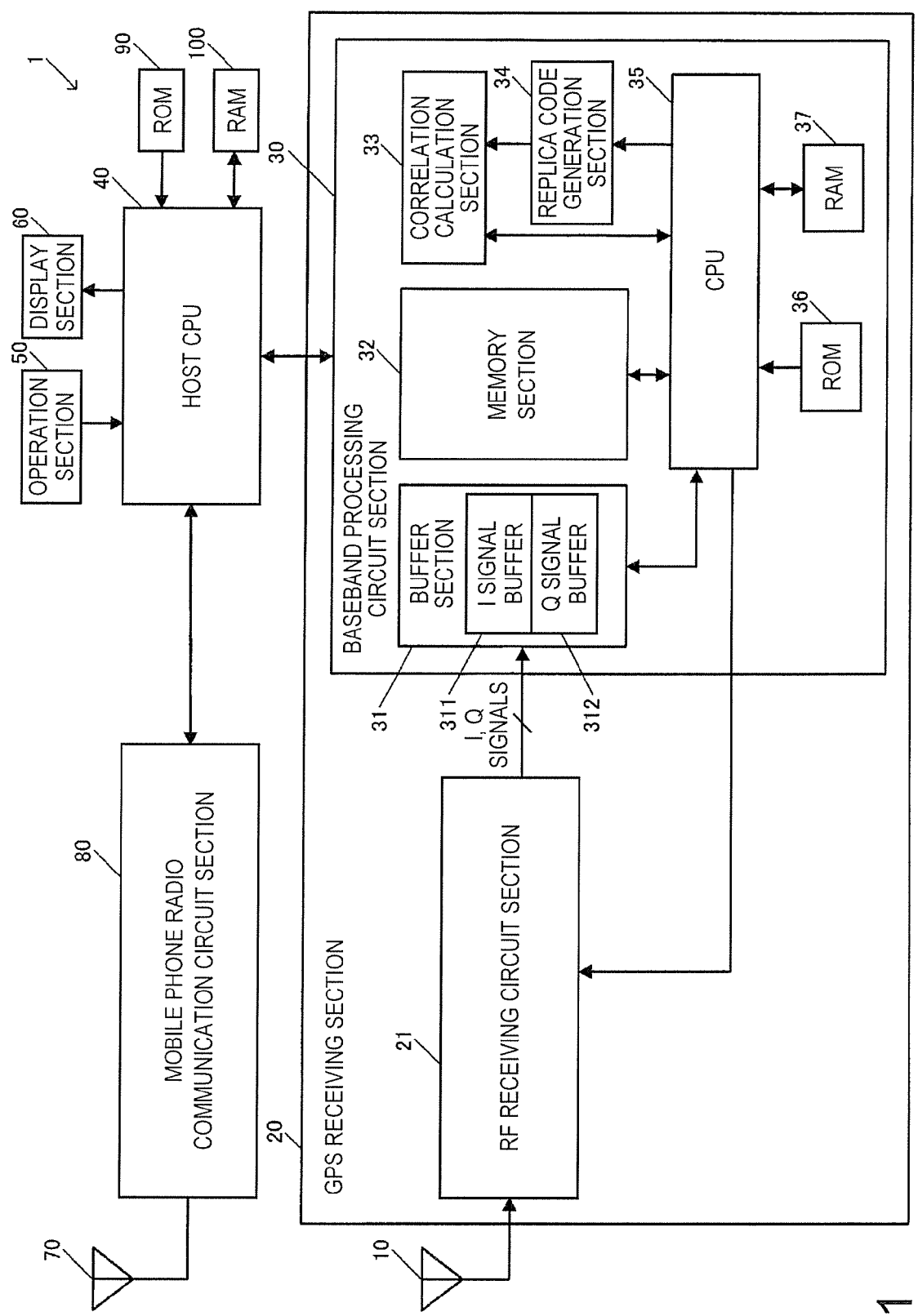
FIG. 1 is a block diagram showing a functional configuration of a portable phone.

FIG. 1 is a block diagram showing a functional configuration of the portable phone 1 as an embodiment according to the invention. The portable phone 1 is configured including a GPS antenna 10, a GPS receiving section 20, a host central processing unit (CPU) 40, an operation section 50, a display section 60, a mobile phone antenna 70, a mobile phone radio communication circuit section 80, a read only memory (ROM) 90, and a random access memory (RAM) 100.

The GPS antenna 10 is an antenna for receiving radio frequency (RF) signals including the GPS satellite signal transmitted from GPS satellites, and outputs the received signals to the GPS receiving section 20. It should be noted that the GPS satellite signal is a communication signal of 1.57542 [GHz] modulated by the direct sequence spread spectrum method with the pseudo random noise (PRN) code, which is a type of a spread code unique to each of the satellites. The PRN code is a pseudo random code having a code length of 1023 chips as 1 PN frame, and a repetition period of 1 ms.

The GPS receiving section 20 is a positioning circuit for positioning the present location of the portable phone 1 based on the signal output from the GPS antenna 10, and a functional block corresponding to a so-called GPS receiver. The GPS receiving section 20 is configured including an RF receiving circuit section 21, and a baseband processing circuit section 30. It should be noted that the RF receiving circuit section 21 and the baseband processing circuit section 30 can be manufactured separately as discrete large scale integration circuits (LSI), or manufactured integrally as one chip.

The RF receiving circuit section 21 is a receiving circuit block for radio frequency signals (RF signals), and for dividing or multiplying a predetermined oscillation signal, thereby generating the oscillation signal for RF signal multiplication. Further, the RF receiving circuit section 21 multiplies the RF signal received by the GPS antenna 10 by the oscillation signal to down-convert the RF signal into an intermediate frequency signal (hereinafter referred to as "IF signal"), amplifies the IF signal which is then converted into a digital signal by an A/D converter, then outputs the digital signal to the baseband processing circuit section 30.

In other words, the RF receiving circuit section 21 is a receiving system for performing signal receiving by a so-called superheterodyne method. Further, although the detailed circuit configuration is not shown in the drawings, the RF receiving circuit section 21 multiplies the oscillation signal and a signal having a phase 90 degrees shifted from the oscillation signal with the RF signal, thereby obtaining the IF signal separated into an inphase component (I component) and a quadrature component (Q component) signals (I signal and Q signal), further executes the A/D conversion on each of the I component and the Q component, and outputs the result to the baseband processing circuit section 30.

The baseband processing circuit section 30 is a circuit section for executing correlation processing or the like on the IF signal output from the RF receiving circuit section 21 to acquire and extract the GPS satellite signal, and decoding the data to perform the positioning calculation. The baseband processing circuit section 30 is comprised of a buffer section 31, a memory section 32, a correlation calculation section 33, a replica code generation section 34, a CPU 35, a ROM 36, and a RAM 37. It should be noted that although it will be described assuming that the CPU 35 executes the positioning calculation of the present location itself in the present embodiment, it is obvious that it can also be assumed that the host CPU 40 executes the positioning calculation of the present location.

The buffer section 31 is a buffer for cumulatively storing the I and Q signals of the received signal, which are input from the RF receiving circuit section 21, in time-series order in accordance with the control signal of the CPU 35. The buffer section 31 is comprised of an I signal buffer 311 for storing time-series data of the I signal and a Q signal buffer 312 for storing time-series data of the Q signal.

The memory section 32 is a memory used when the CPU 35 executes cumulative addition on each of the time-series data of the respective I and Q signals stored in the buffer section 31. The CPU 35 dynamically allocates storage area in the memory section 32 to execute the cumulative addition on the I and Q signals based on the result of estimation of the polarity reversal timing of the I and Q signals by a polarity reversal timing estimation processing and the result of estimation of which polarity appears more frequently of each of the I and Q signals by a frequent polarity estimation processing, further described later.

Specifically, if the estimation of the polarity reversal timing is successful, the CPU 35 performs the cumulative addition of the signal for the polarity (hereinafter referred to as "frequent polarity"), which is estimated to appear more frequently with respect to each of the I and Q signals by the frequent polarity estimation processing, until a first cumulative addition time (e.g., "200 milliseconds") elapses. On this occasion, the CPU 35 allocates two storage areas in the memory section 32 respectively for the polarity estimated to appear more frequently of the I and Q signals, and executes the cumulative addition on the signals with the corresponding polarities in the respective storage areas.

For example, in the case in which the estimated frequent polarity of the I signal is "positive," and the estimated frequent polarity of the Q signal is "negative," the CPU 35 allocates the storage area for the positive I signal (I+ signal) and the storage area for the negative Q signal (Q− signal), and cumulatively adds the positive I signal in the former storage area, and the negative Q signal in the latter storage area.

On the other hand, if the estimation of the polarity reversal timing is unsuccessful, the CPU 35 cumulatively adds each of the I and Q signals, which are cumulatively stored in the buffer section 31, until a second cumulative addition time (e.g., "10 milliseconds") elapses. On this occasion, the CPU 35 allocates two storage areas in the memory section 32 respectively for the I and Q signals, and executes the cumulative addition on the corresponding signals in the respective storage areas.

If the estimation of the polarity reversal timing has been successful, the signal with the polarity estimated to appear more frequently with respect to each of the I and Q signals can be cumulatively added, and even if each of the signals is cumulatively added for a long period of time, there is no chance that the cancellation of the signal is caused by adding the components of the received signal with polarities opposite to each other. Further, since the cumulative addition is not executed on the signal with the polarity appearing less frequently, the efficient cumulative addition can be achieved.

However, if the estimation of the polarity reversal timing is unsuccessful, it is not achievable to cumulatively add only the signal with the polarity estimated to appear more frequently with respect to each of the I and Q signals, and therefore, if the signal is cumulatively added for a period of time longer than a time interval of the polarity reversal timing, there is a possibility of canceling a part or the whole of the signal by adding the components of the received signal with the polarities opposite to each other. Therefore, the second cumulative addition time is required to be shorter than the first cumulative addition time, and preferably "20 milliseconds" or less which is the time interval of the polarity reversible timing.

The correlation calculation section 33 is a circuit section for calculating the correlation between the signal obtained as a result of the sum of squares of the cumulatively added signal in each of the storage areas allocated by the CPU 35 in the memory section 32 and the replica code generated by the replica code generation section 34. Specifically, the correlation calculation section 33 executes the correlation calculation between the sum-of-squared signal and the replica code while shifting the phase of the replica code (the code phase), and outputs the correlation values in the respective code phases to the CPU 35.

The replica code generation section 34 generates the replica code replicating the PRN code of the GPS satellite (hereinafter referred to as "target satellite") in accordance with the control signal from the CPU 35, and outputs the replica code generated to the correlation calculation section 33.

The CPU 35 is a processor for executing predetermined positioning calculation to perform positioning of the present location of the portable phone 1. Specifically, the CPU 35 detects the PRN code and the code phase included in the GPS satellite signal to acquire and track the GPS satellite signal based on the correlation values output from the correlation calculation section 33. Subsequently, the CPU 35 decodes the data of the GPS satellite signal thus captured and tracked, executes the calculation of the pseudo range and positioning calculation based on the orbital information, the time information, and so on of the GPS satellite, thereby positioning the present location of the portable phone 1.

Figure 2:
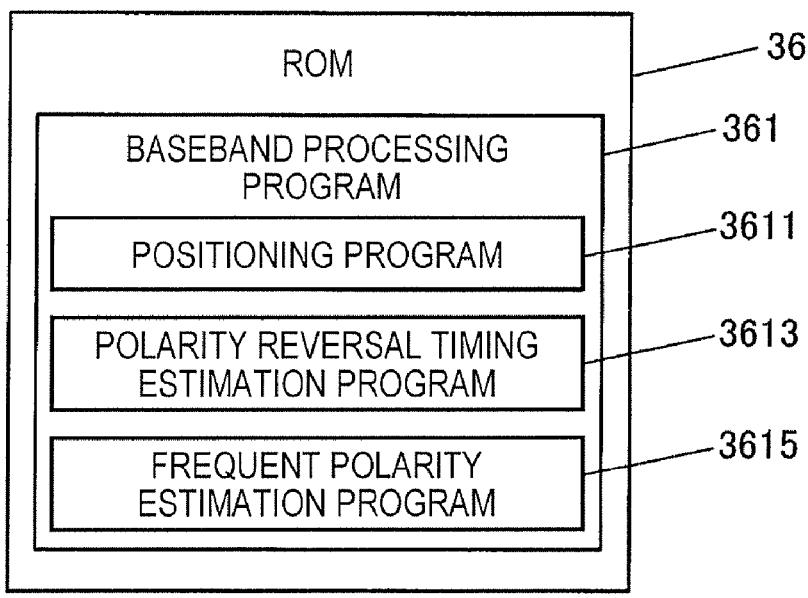
FIG. 2 is a diagram showing an example of data stored in a ROM.

FIG. 2 is a diagram showing an example of the data stored in the ROM 36. The ROM 36 stores a baseband processing program 361 retrieved by the CPU 35 and executed as the baseband processing (see FIG. 5). Further, the baseband processing program 361 includes subroutines such as the positioning program 3611 executed as the positioning processing (see FIGS. 6 and 7), the polarity reversal timing estimation program 3613 executed as the polarity reversal timing estimation processing (see FIG. 8), and the frequent polarity estimation program 3615 executed as the frequent polarity estimation processing.

The positioning processing is the processing by the CPU 35 for executing predetermined positioning calculation to perform positioning of the present location of the portable phone 1. More specifically, for each of the target satellites, the CPU 35 dynamically allocates the storage areas in the memory section 32 to execute cumulative addition on each of the I and Q signals based on the result of the estimation of the polarity reversal timing and frequent polarity of the received signal, and outputs the signal of the sum of squares of the signals, which is obtained by the cumulative addition, to the correlation calculation section 33. Subsequently, based on the result of the correlation calculation by the correlation calculation section 33, the CPU 35 determines whether the acquiring of each of the target satellites has been successful or unsuccessful, and executes predetermined positioning calculation using the information of the pseudo ranges of the satellites (hereinafter referred to as "captured satellites") captured successfully, thereby positioning the present location of the portable phone 1.

The polarity reversal timing estimation processing is the processing by the CPU 35 for estimating the polarity reversal timing and the polarity of the received signal for each of the target satellites. More specifically, in the case in which the navigation data of the GPS satellite signal of the present target satellite has already been acquired, so-called pattern-matching processing, which uses the time-series data of the received signal cumulatively stored in the buffer section 31 as the object data and the time-series data of the acquired navigation data as reference, is executed, and the polarity reversal timing and the polarity of the received signal are estimated based on the result of the pattern-matching processing.

On the other hand, if the navigation data of the present target satellite has not yet been acquired, a common data part having the common data content is selected from the acquired navigation data. Then, the pattern-matching processing, which uses the received signal cumulatively stored in the buffer section 31 as the determination object data, and the common data part as the reference data, is executed, and the polarity reversal timing and the polarity of the received signal are estimated based on the result of the pattern-matching.

The frequent polarity estimation processing is the processing for estimating which polarity of the received signal thereafter appears more frequently based on the polarity reversal timing and the polarity of the received signal estimated by the polarity reversal timing estimation processing. The baseband processing, the positioning processing, and the polarity reversal timing estimation processing will be described later in detail using the respective flowcharts. Further, the frequent polarity estimation processing will also be described later in detail.

Figure 3:
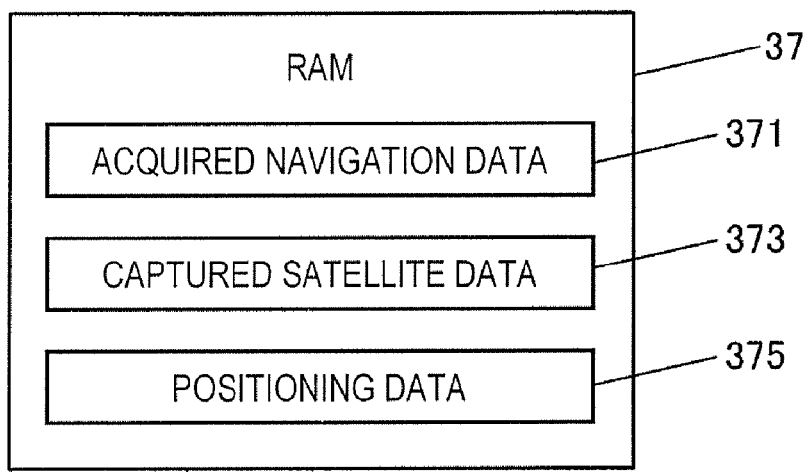
FIG. 3 is a diagram showing an example of data stored in a RAM.

FIG. 3 is a diagram showing an example of the data to be stored in the RAM 37. The RAM 37 stores acquired navigation data 371, captured satellite data 373, and positioning data 375.

Figure 4:
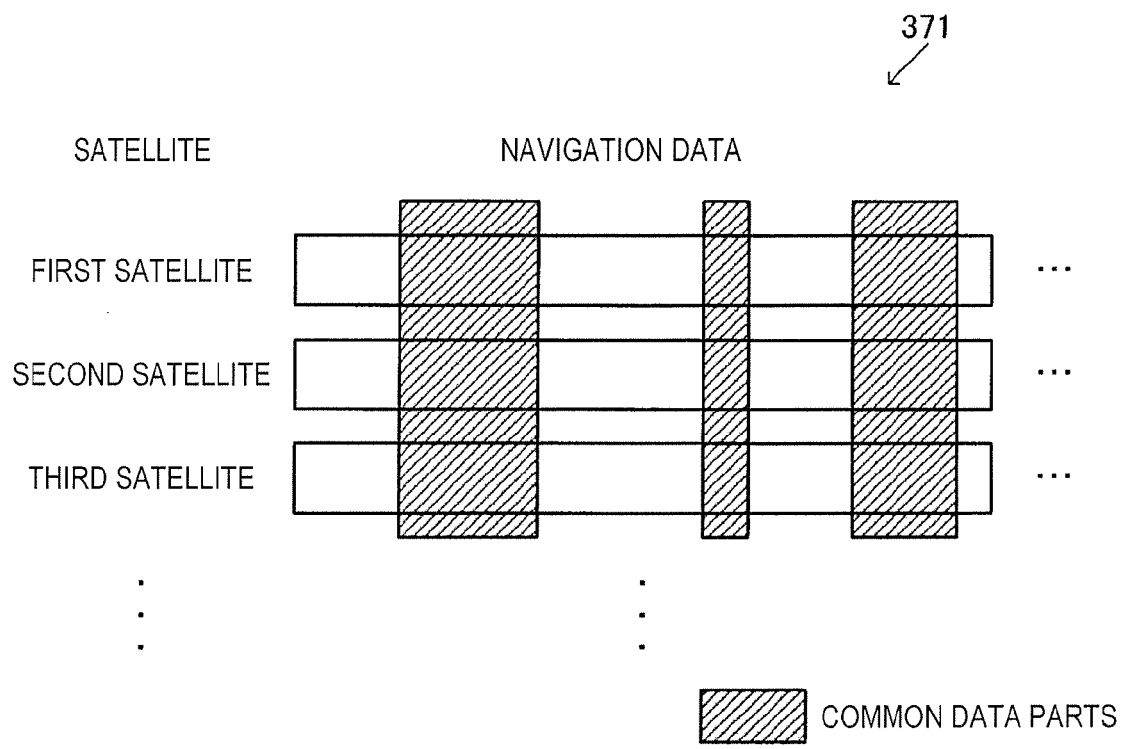
FIG. 4 is an explanatory diagram of the data content of the acquired navigation data.

FIG. 4 is a diagram for explaining the data content of the acquired navigation data 371. In the area of the acquired navigation data 371, the acquired navigation data is stored in correspondence with the numbers of the GPS satellites.

The navigation data is a signal having 20 cycles of PRN code (=20 PN frames) as 1 bit, and includes the data such as almanac, ephemeris, an ionospheric correction parameter, and Coordinated Universal Time (UTC) information. Among such data, the almanac, the ionospheric correction parameter, and the UTC information, for example, are common to all of the GPS satellites. Such a part of the navigation data having the content common thereto is referred to as "a common data part". In FIG. 4, to explain the concept of the common data parts, the areas corresponding to the common data parts are provided with hatching.

It is possible to adopt the configuration in which the mobile phone radio communication circuit section 80 communicates with a base station (hereinafter referred to as "the base station communication") to receive and acquire the navigation data of all of the GPS satellites when, for example, starting the positioning. It should be noted that it is also possible to receive the navigation data of only those satellites supposedly located above the portable phone 1 in the sky (supposed visible satellites), instead of receiving the navigation data of all of the GPS satellites.

Further, it is also possible to adopt the configuration of decoding the navigation data internally in the portable phone 1 and treat it as the acquired navigation data instead of acquiring the navigation data by the base station communication. Specifically, it is possible to store the navigation data acquired by decoding the GPS satellite signal (captured satellite signal) of the captured satellite as the acquired navigation data 371 so as to correspond to the number of the present captured satellite.

The captured satellite data 373 is the data containing the numbers of the captured satellites, and is updated by the CPU 35 in the baseband processing.

The positioning data 375 is the data containing the positioning location obtained by the positioning calculation, and is updated by the CPU 35 in the baseband processing.

The host CPU 40 is a processor for integrally controlling each of the sections of the portable phone 1 along various kinds of programs such as a system program stored in the ROM 90. The host CPU 40 makes the display section 60 display the navigation screen plotting the positioning location input from the CPU 35.

The operation section 50 is an input device comprised, for example, of a touch panel and button switches, and outputs to the host CPU 40 the signals corresponding to pressed keys or buttons. By operating the operation section 50, various kinds of instruction inputs such as a call request, send or receive request of an electronic mail are executed.

The display section 60 is a display device comprised of a liquid crystal display (LCD) or the like, and executing various types of display based on the display signal input from the host CPU 40. On the display section 60, the navigation screen, the time information, and so on are displayed.

The mobile phone antenna 70 is an antenna for performing transmission and reception of the mobile phone radio communication signal with the wireless base stations installed by the communication service company of the portable phone 1.

The mobile phone radio communication circuit section 80 is a communication circuit section of the mobile phone mainly comprised of an RF conversion circuit, a baseband processing circuit, and so on, and executes modulation and demodulation on the mobile phone radio signal, thereby realizing phone calls, sending and receiving of the electronic mails, and so on.

The ROM 90 stores a system program for the host CPU 40 to control the portable phone 1, various programs and data for the host CPU 40 to realizing the navigation function, and so on.

The RAM 100 forms a work area for temporarily storing the system program, various types of processing programs executed by the host CPU 40, and in-process data and process results of the various types of processing.

2. Flow of Processing

Figure 5:
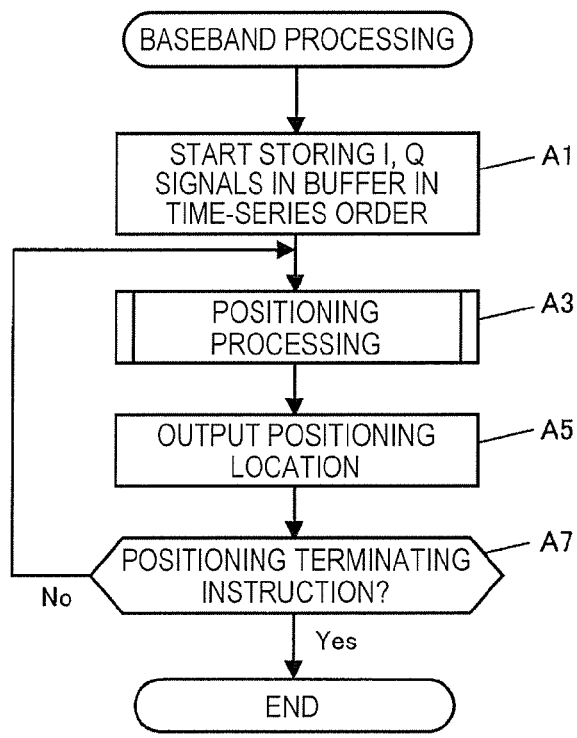
FIG. 5 is a flowchart showing the flow of the baseband processing.

FIG. 5 is a flowchart showing the flow of the baseband processing corresponding to the baseband processing program 361 stored in the ROM 36, then retrieved therefrom by the CPU 35, and executed by the CPU 35 in the portable phone 1.

The baseband processing is to execute the processing, given the GPS satellite signal is received by the RF receiving circuit section 21, upon a detection by the CPU 35 that an operation requesting to start positioning is executed on the operation section 50. Such processing is executed in parallel to various types of processing such as execution of the various application programs. It should be noted that it is also possible to couple the turning on or off of the portable phone 1 with the starting and stopping of the GPS receiving section 20 which includes the RF receiving circuit section 21, so as to start the processing upon a detection of the portable phone 1 being turned on.

Further, although not specifically explained, while the baseband processing described below is in progress, it is assumed that the reception of the RF signal by the GPS antenna 10 and the down-conversion into the IF signal and the I-Q separation of the signal by the RF receiving circuit section 21 are being executed, and the I and Q signals of the received signal are output to the baseband processing circuit section 30 as needed.

The CPU 35 cumulatively stores the I and Q signals of the received signal output from the RF receiving circuit section 21 in the buffer section 31, I signal buffer 311 and the Q signal buffer 312 respectively in chronological order (step A1). Then, the CPU 35 retrieves the positioning program 3611 stored in the ROM 36 to execute the program to perform the positioning processing (step A3).

Figure 6:
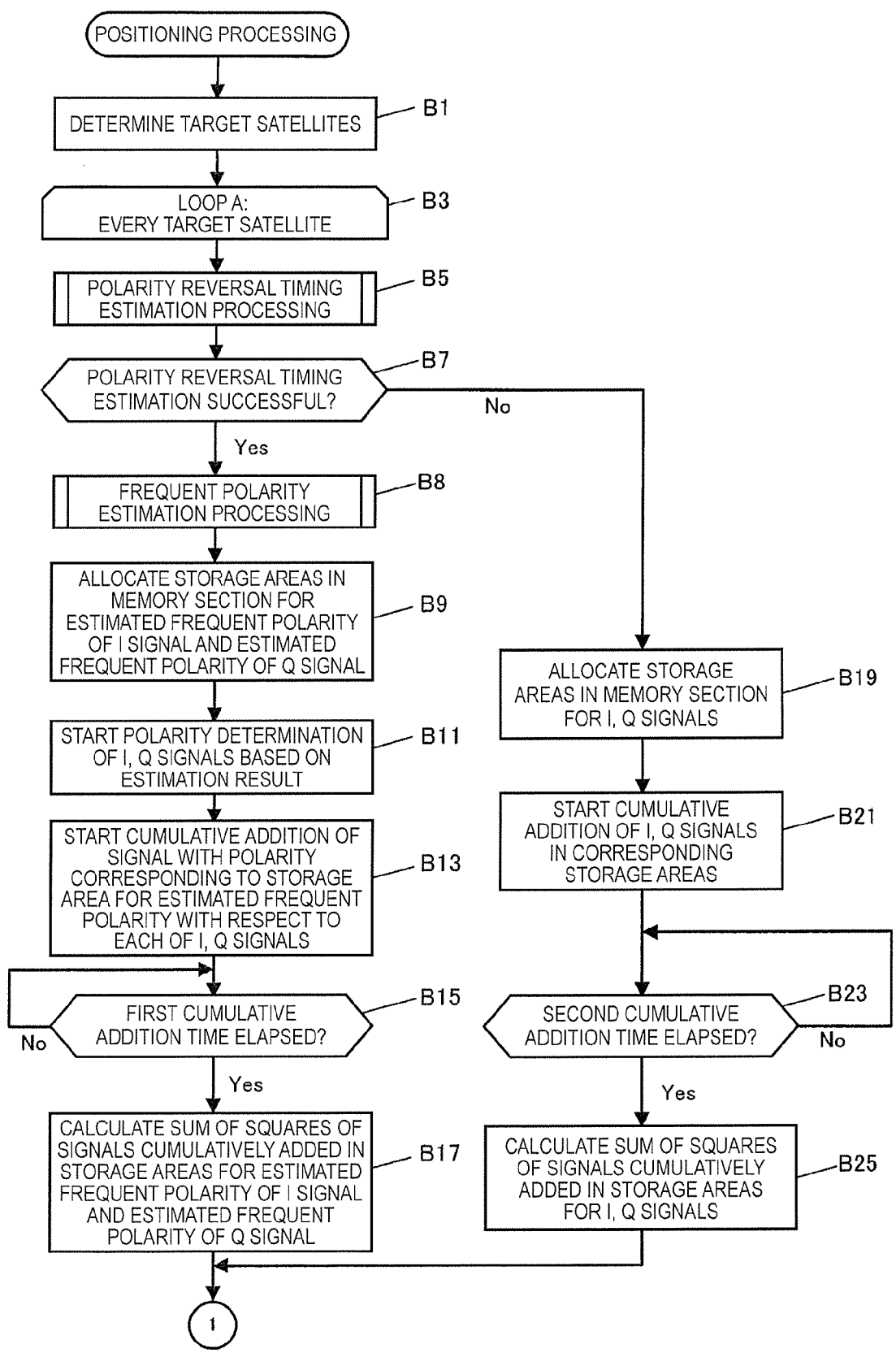
FIG. 6 is a flowchart showing the flow of the positioning processing.
Figure 7:
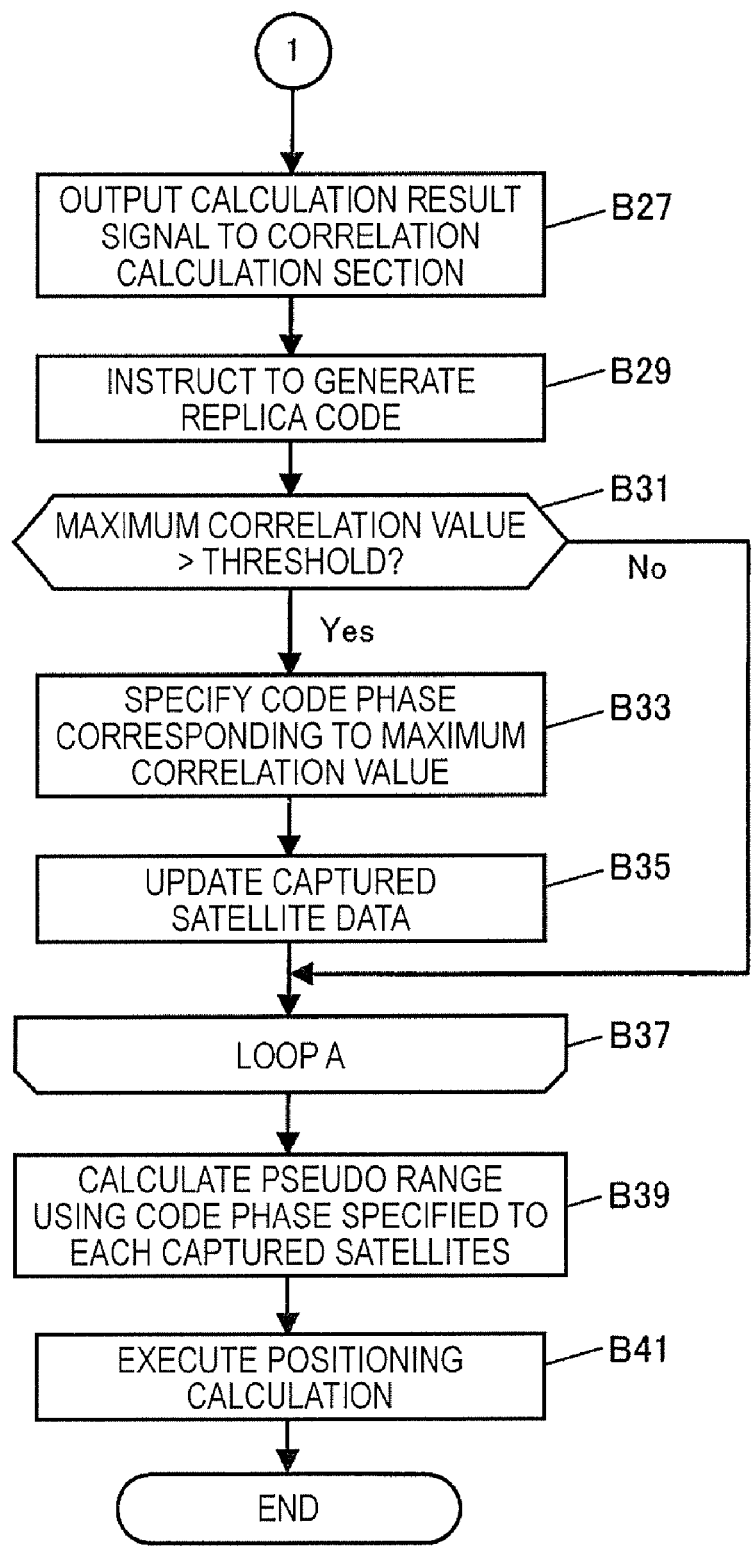
FIG. 7 is a flowchart showing the flow of the positioning processing.

FIGS. 6 and 7 are flowcharts showing the flow of the positioning processing.

The CPU 35 determines the target satellites based on the data such as almanac of the acquired navigation data stored in the acquired navigation data 371 of the RAM 37 (step B1). Then, the CPU 35 executes the process corresponding to the loop A (steps B3 through B37) for each of the target satellites. In the loop A, the CPU 35 retrieves the polarity reversal timing estimation program 3613 stored in the ROM 36 and executes the program, thereby performing the polarity reversal timing estimation processing (step B5).

Figure 8:
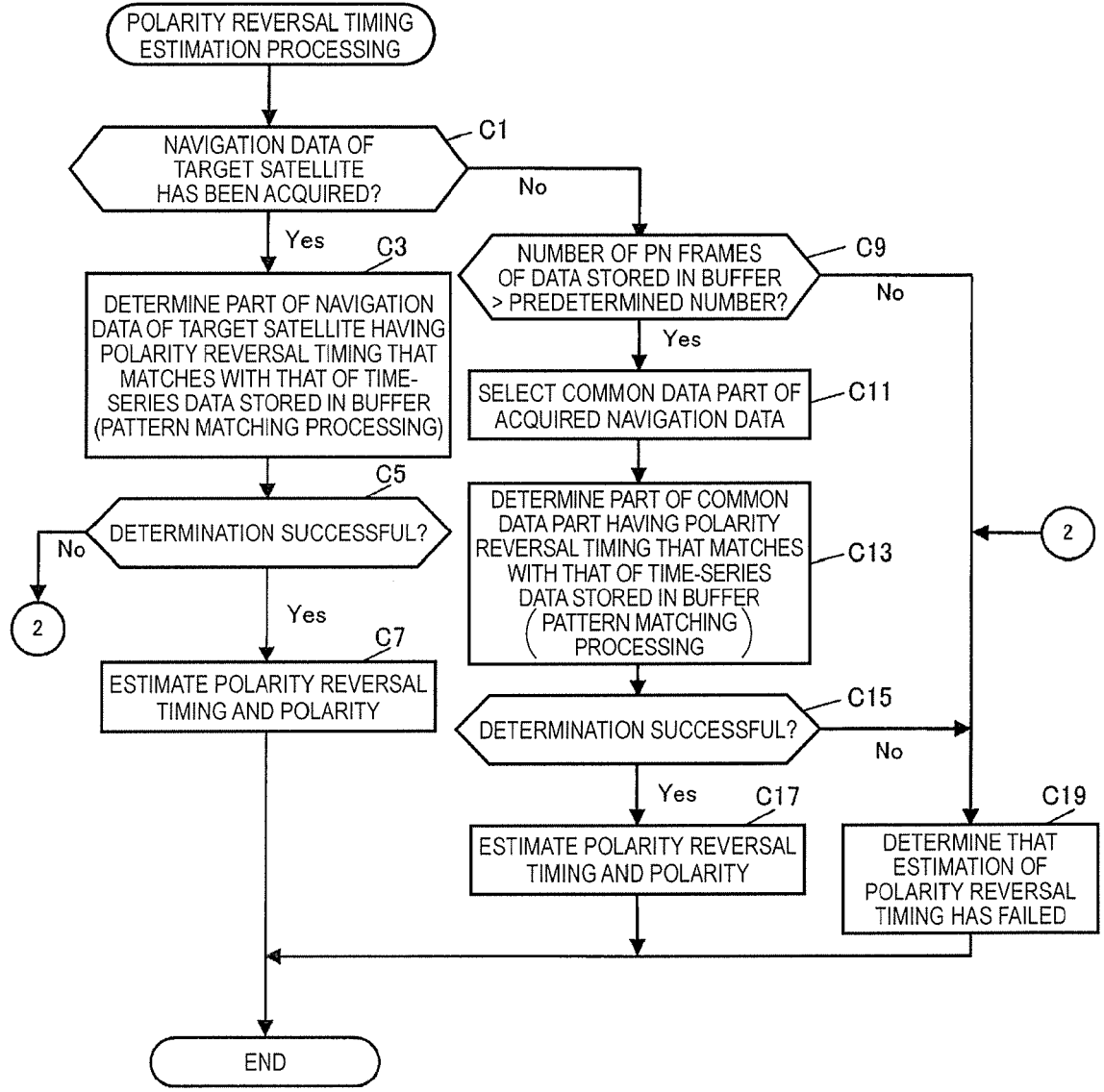
FIG. 8 is a flowchart showing the flow of the polarity reversal timing estimation processing.

FIG. 8 is a flowchart showing the flow of the polarity reversal timing estimation processing.

The CPU 35 looks up the acquired navigation data 371 of the RAM 37, and determines whether or not the navigation data of the present target satellite has been acquired (step C1). Then, if it is determined that the acquisition has been done (Yes in the step C1), the CPU 35 executes the processing (the pattern-matching processing) to determine the matching part in the navigation data of a polarity reversal timing by comparing the time-series data of I and Q signals stored in the buffer section 31 with that of the navigation data of the target satellite stored in the acquired navigation data 371.

Subsequently, the CPU 35 determines whether or not the determination of the matching part is successful (step C5), and if it is successful (Yes in the step C5), the CPU 35 estimates the polarity reversal timing and the polarity of the received signal expected to be received thereafter based on the polarity reversal timing and the polarity on and after the matching part in the navigation data (step C7). Further, the CPU 35 terminates the polarity reversal timing estimation process.

Further, if it is determined in the step C1 that the navigation data of the target satellite has not been acquired (No in the step C1), the CPU 35 determines whether or not the number of PN frames in the data of I and Q signals stored in the buffer section 31 exceeds a predetermined number (e.g., "200") (step C9). Then, if it is determined that it exceeds the predetermined number (Yes in the step C9), the CPU 35 selects the common data part of the acquired navigation data stored in the acquired navigation data 371 (step C11).

Subsequently, the CPU 35 executes the processing (the pattern-matching processing) of comparing the time-series data of the I and Q signals stored in the buffer section 31 with the common data part to determine the part in the common data part in which the polarity reversal timing matches (step C13). Subsequently, the CPU 35 determines whether or not the determination of the matching part is successful (step C15), and if it is successful (Yes in the step C15), the CPU 35 estimates the polarity reversal timing and the polarity of the received signal expected to be received thereafter based on the polarity reversal timing and the polarity on and after the matching part in the common data part (step C17).

It should be noted that since the navigation data of the target satellite has not yet been acquired, the polarity reversal timing and the polarity thereof in the data part after the common data part in the navigation data (herein after referred to as "a non-common data part") can not be estimated. Therefore, the polarity reversal timing and the polarity of the received signal available for the CPU 35 to estimate in the step C17 is limited to the polarity reversal timing and the polarity of the part of the received signal corresponding to the common data part of the navigation data. After estimating the polarity reversal timing, the CPU 35 terminates the polarity reversal timing estimation processing.

On the other hand, if the CPU determines in the step C9 that the number of PN frames of the data stored in the buffer section 31 is equal to or smaller than the predetermined number (No in the step C9), the CPU 35 determines that the estimation of the polarity reversal timing of the received signal is unsuccessful (step C19). Further, if it is determined in the step C5 or the step C15 that the determination of the matching part is unsuccessful (No in the step C5 or step C15), it is also determined that the estimation of the polarity reversal timing of the received signal is unsuccessful (step C19). Then the CPU 35 terminates the polarity reversal timing estimation processing.

Going back to the positioning processing shown in FIG. 6, after executing the polarity reversal timing estimation processing, the CPU 35 determines whether or not the estimation of the polarity reversal timing has been successful (step B7), and if it is successful (Yes in the step B7), the CPU 35 retrieves and then executes the frequent polarity estimation program 3615 stored in the ROM 36 to perform the frequent polarity estimation processing (step B8).

Specifically, in the case in which the navigation data of the target satellite has been acquired, which of either positive or negative polarity appears more frequently in each of the signals is estimated for the data part on and after the matching part of the navigation data determined in the step C3 based on the polarity reversal timing and the polarity thereof estimated in the step C7. On the other hand, in the case in which the navigation data of the target satellite has not been acquired, which of either positive or negative polarity appears more frequently in each of the signals is estimated for the data part on and after the matching part of the common data part determined in the step C13 based on the polarity reversal timing and the polarity thereof estimated in the step C17.

It should be noted that in the case in which the navigation data of the target satellite has not been acquired yet, the CPU 35 is unable to estimate the polarity reversal timing and the polarity thereof in the non-common data part of the navigation data, and therefore, is unable to estimate the frequency of each of the polarities. Therefore, it is preferable to execute the cumulative addition of the signal only on the part corresponding to the common data part of the navigation data.

Subsequently, the CPU 35 allocates the storage areas for the frequent polarity of the I signal and the frequent polarity of the Q signal in the memory section 32 based on the estimation result of the frequent polarity estimation processing (step B9). Then, the CPU 35 starts the determination of the polarity for each of the I and Q signals based on the result of the estimation of the polarity reversal timing and the polarity thereof (step B11). Further, with respect to each of the I and Q signals stored in the buffer section 31, the CPU 35 starts the processing of cumulatively adding the respective signals with the corresponding polarities in the storage areas for the frequent polarities in the memory section 32 (step B13).

Subsequently, the CPU 35 executes the polarity determination and the cumulative addition for each of the I and Q signals until the first cumulative addition time (e.g., "200 milliseconds") elapses, and if it is determined that the first cumulative addition time has elapsed (Yes in the step B15), the sum of squares of the signals cumulatively added in the storage areas allocated in the memory section 32 for the frequent polarity of the I signal and the Q signal respectively (step B17).

On the other hand, if it is determined in the step B7 that the estimation of the polarity reversal timing is unsuccessful (No in the step B7), the CPU 35 allocates the storage areas for the I signal and the Q signal, respectively, in the memory section 32 (step B19). Further, the CPU 35 starts the processing of cumulatively adding each of the I and Q signals stored in the buffer section 31, in the corresponding storage areas (step B21).

Subsequently, the CPU 35 executes the cumulative addition for each of the I and Q signals until the second cumulative addition time (e.g., "10 milliseconds") elapses. Then, if it is determined that the second cumulative addition time has elapsed (Yes in the step B23), the CPU 35 calculates the sum of squares of the signals cumulatively added in the respective storage areas allocated in the memory section 32 for the I signal and the Q signal (step B25).

After calculating the sum of squares of the signals in the step B17 or B25, the CPU 35 outputs the signal of the calculation result to the correlation calculation section 33 (step B27). Further, the CPU 35 provides to the replica code generation section 34 with the instruction of generating the replica code of the PRN code unique to the target satellite (step B29).

Further, the CPU 35 determines whether or not the maximum correlation value, which is the maximum value of the correlation values output from the correlation calculation section 33, exceeds a predetermined threshold value (step B31) Then, if it is determined that the maximum correlation value is equal to or smaller than the threshold value (No in the step B31), the CPU 35 determines that the acquisition of the target satellite is not successful, and proceeds to next target satellite.

Further, if it is determined that the maximum correlation value has exceeded the threshold value (Yes in the step B31), the CPU 35 identifies the code phase corresponding to the maximum correlation value (step B33). Further, the CPU 35 adds the target satellite to the captured satellites, updates the captured satellite data 373 of the RAM 37 (step B35), and then proceeds to the next target satellite.

After executing the processing of the steps B5 through B35 for all of the target satellites, the CPU 35 terminates the processing of the loop A. Subsequently, with respect to each of the captured satellites stored in the captured satellite data 373 of the RAM 37, the CPU 35 calculates the pseudo range from the captured satellite to the portable phone 1 using the identified code phase (step B39).

Subsequently, the CPU 35 executes the positioning calculation using, for example, the least-squares method or the Kalman filter, using the pseudo ranges calculated for the plurality of captured satellites to perform positioning (step B41) of the present location of the portable phone 1, and stores the location in the positioning data 375 of the RAM 37. It should be noted that since a method known to the public can be applied to the positioning calculation using the least-squares method or the Kalman filter, detailed explanations therefor will be omitted here. Then, the CPU 35 terminates the positioning process.

Going back to the baseband processing shown in FIG. 5, after executing the positioning processing, the CPU 35 outputs the location stored in the positioning data 375 of the RAM 37 to the host CPU 40 (step A5). Then, the CPU 35 determines whether or not the user has provided an instruction to terminate positioning to the operation section 50 (step A7). If it is determined that no such instruction has been provided (No in the step A7), the CPU 35 returns the processing to the step A3. Further, if it is determined that an instruction to terminate positioning has been provided (Yes in the step A7), the CPU 35 terminates the baseband processing.

3. Functions and Advantages

According to the present embodiment, the cumulative addition is executed on each of the I and Q components of the received signal for either one of the polarities, and the correlation calculation is executed by calculating the sum of squares of the results of the cumulative addition. Therefore, there is no chance of occurring the cancellation of the signals caused by adding the components with the polarities opposite to each other, thus the degradation in the receiver sensitivity can effectively be prevented.

Further, in the present embodiment, it is arranged that in the case in which the navigation data of the target satellite has already been acquired, the pattern-matching processing is utilized to determine the matching part between the time-series data of the acquired navigation data being the reference data and the time-series data of the received signal. In the case in which the navigation data of the target satellite has not been acquired, the pattern-matching processing is utilized to determine the matching part between the common data part of the navigation data being the reference data and the time-series data of the received signal. According to the configuration described above, it becomes possible to perform the estimation of the polarity reversal timing and the polarity of the received signal and the estimation of which polarity thereafter appears more frequently in the received signal. Further, since the cumulative addition for the polarity with a higher likelihood of appearing can be executed, it is possible to realize the efficient cumulative addition of the received signal used for the correlation calculation.

4. Modified Examples 4-1. Electronic Apparatus

The invention can be applied to any electronic apparatus provided the electronic apparatus is equipped with a positioning device. For example, the invention can be applied to a laptop personal computer, a personal digital assistant (PDA), a vehicle navigation device, and so on in a similar manner.

4-2. Satellite Positioning System

In the embodiment described above, although the explanations are presented exemplifying the GPS as the satellite positioning system, other satellite positioning systems such as Wide Area Augmentation System (WAAS), Quasi Zenith Satellite System (QZSS), GLObal NAvigation Satellite System (GLONASS), or GALILEO can also be adopted.

4-3. Split of Processing

It is possible to arrange that the host CPU 40 executes a part or the whole of the processing to be executed by the CPU 35. For example, it is possible to arrange that the host CPU 40 executes the polarity reversal timing estimation processing and the frequent polarity estimation processing, and the CPU 35 executes the positioning calculation based on the estimation result. Alternatively, it is also possible to arrange the host CPU 40 to execute the whole processing including the positioning calculation, instead of the CPU 35.

4-4. Correlation Calculation Processing

Although in the embodiment described above, the explanations are presented assuming that the correlation calculation section 33 is separately provided in the baseband processing circuit section 30 to calculate correlation between the sum of squares of the results of the cumulative addition of the received signal and the replica code on hardware, it is also possible to realize that on software by configuring the CPU 35 to execute the correlation calculation processing.

4-5. Combination of Results of Cumulative Addition

Further, although in the embodiment described above, the explanations are presented assuming that the sum of squares of the results of the cumulative addition of the received signal is calculated to execute the correlation calculation with the replica code, it is possible to arrange that the sum of biquadrates or the sum of sextuplicates of the results of the cumulative addition of the received signal is calculated to execute the correlation calculation with the replica code instead of the sum of squares of the results of the cumulative addition of the received signal.

What is claimed is:

1. A positioning method for positioning a present position of a terminal device including a central processing unit (CPU), the positioning method comprising:
   (a) executing by the CPU a cumulative addition of I components of a received positioning signal from a satellite and a cumulative addition of Q components of the received positioning signal for either one of the polarities, the received positioning signal being spread-modulated with a spread code that can be reversed in polarity by navigation data;
   (b) calculating by the CPU sum of squares of the result of the cumulative addition of I components and the result of the cumulative addition of Q components in step (a);
   (c) calculating by the CPU correlation between the sum of squares calculated in step (b) with a replica code of the spread code; and
   (d) executing by the CPU a positioning calculation of the present position based on the result of the correlation calculation in step (c) to inform a user the present position.

2. The positioning method according to claim 1, further comprising
   (e) determining by the CPU a matching part of a polarity reversal timing in the navigation data by comparing time-series data of the received signal and time-series data of the navigation data of the positioning signal; and
   (f) estimating which polarity appears more frequently in the received signal based on the result of the determination in step (e),
   wherein the cumulative addition is executed for the polarity estimated to appear more frequently.

3. The positioning method according to claim 2, further comprising
   (g) estimating by the CPU the polarity reversal timing and the polarity of the received signal based on the result of the determination,
   wherein the cumulative addition is executed for the polarity estimated to appear more frequently, provided that the polarity for each of the I and Q components of the received signal is determined based on the estimated polarity reversal timing and polarity.

4. The positioning method according to claim 1, further comprising
   (h) selecting by the CPU a common data part that is common to navigation data of different positioning signals;
   (i) determining by the CPU a matching part of the polarity reversal timing in the common data part by comparing the time-series data of the received signal with the common data part; and
   (j) estimating by the CPU which polarity appears more frequently in the received signal based on the result of the determination in step (i),
   wherein the cumulative addition is executed for the polarity estimated to appear more frequently.

5. The positioning method according to claim 4, further comprising
   (g) estimating by the CPU the polarity reversal timing and the polarity of the received signal based on the result of the determination,
   wherein the cumulative addition is executed for the polarity estimated to appear more frequently, provided that the polarity for each of the I and Q components of the received signal is determined based on the estimated polarity reversal timing and polarity.

6. The positioning method according to claim 1, further comprising
  (k) making by the CPU a first determination of a matching part of the polarity reversal timing in the navigation data, in the case in which the navigation data corresponding to the positioning signal has been acquired, by comparing time-series data of the received signal with time-series data of the navigation data of the positioning signal;
  (l) estimating by the CPU, in the case in which the navigation data corresponding to the positioning signal has been acquired, which polarity appears more frequently in the received signal based on the result of the first determination;
  (h) selecting by the CPU a common data part that is common to navigation data of different positioning signals;
  (m) making by the CPU a second determination of a matching part of the polarity reversal timing in the common data part in the case in which the navigation data corresponding to the positioning signal has not been acquired, by comparing the time-series data of the received signal with the common data part; and
  (n) estimating by the CPU, in the case in which the navigation data corresponding to the positioning signal has not been acquired, which polarity appears more frequently in the received signal based on the result of the second determination, wherein the cumulative addition is executed for the polarity estimated to appear more frequently.

7. A computer-readable medium storing a program that causes a computer incorporated in a positioning device to execute a positioning method for positioning a present position of a terminal device including a central processing unit (CPU), the positioning method comprising:
  (a) executing by the CPU a cumulative addition of I components of a received positioning signal from a satellite and a cumulative addition of Q components of the received positioning signal for either one of the polarities, the received positioning signal being spread-modulated that can be reversed in polarity by navigation data;
  (b) calculating by the CPU sum of squares of the result of the cumulative addition of I components and the result of the cumulative addition of Q components in step (a);
  (c) calculating by the CPU correlation between the sum of squares calculated in step (b) with a replica code of the spread code; and
  (d) executing by the CPU a positioning calculation of the present position based on the result of the correlation calculation in step (c) to inform a user the present position.

* * * * *